United States Patent [19]

Rosman

[11] Patent Number: 4,715,180

[45] Date of Patent: Dec. 29, 1987

[54] HYDRAULIC LIFT MECHANISM

[75] Inventor: Alan H. Rosman, Madrid, Spain

[73] Assignee: Dynamic Hydraulic Systems, Inc., Canoga Park, Calif.

[21] Appl. No.: 601,481

[22] Filed: Apr. 18, 1984

Related U.S. Application Data

[63] Continuation-in-part of Ser. No. 570,590, Jan. 13, 1984, abandoned.

[51] Int. Cl.[4] ............................................. F16H 39/46
[52] U.S. Cl. ..................................... 60/372; 60/378; 60/414; 60/455; 60/465; 60/466; 60/489; 91/420
[58] Field of Search ................. 60/413, 414, 415, 417, 60/418, 487, 488, 490, 911, 416, 371, 372, 493, 489, 465, 466, 455, 378, 433; 417/220, 63, 374; 91/420

[56] References Cited

U.S. PATENT DOCUMENTS

| | | | |
|---|---|---|---|
| 2,780,204 | 2/1957 | Barley | 91/6 |
| 3,238,722 | 3/1966 | Berkman et al. | 60/416 |
| 3,400,636 | 9/1968 | Schneider | 60/417 |
| 3,747,351 | 7/1973 | Wilkerson et al. | 91/420 X |
| 3,864,915 | 2/1975 | Metailler | 60/911 |
| 3,911,677 | 10/1975 | Collins | 60/911 |
| 3,918,855 | 11/1975 | Bornholdt | 417/220 |
| 3,939,656 | 2/1976 | Goldfein | 60/464 X |
| 3,943,824 | 3/1976 | Fletcher | 91/420 X |
| 3,971,215 | 7/1976 | Baron et al. | 60/416 |
| 4,008,571 | 2/1977 | Evans | 60/911 |
| 4,111,283 | 9/1978 | Hastings, Jr. | 91/445 |
| 4,188,787 | 2/1980 | Bromell et al. | 60/416 X |
| 4,259,039 | 3/1981 | Arnold | 417/220 |
| 4,325,215 | 4/1982 | Yamamoto | 417/220 |
| 4,341,149 | 7/1982 | Dezelan | 60/413 |
| 4,480,963 | 11/1984 | Ring | 417/218 X |
| 4,546,607 | 10/1985 | Kime | 60/372 |
| 4,571,941 | 2/1986 | Aoyagi et al. | 60/466 |

FOREIGN PATENT DOCUMENTS 142104  11/1980  Japan ................................. 60/442

Primary Examiner—Edward K. Look
Attorney, Agent, or Firm—Hopgood, Calimafde, Kalil, Blaustein & Judlowe

[57] ABSTRACT

The invention contemplates hydraulic-lift mechanism which employs a power integrator in the connection between a charged hydraulic accumulator and the actuator for a vertically positionable load; the power integrator, additionally, has a prime-mover connection, and the pressurized charge of the accumulator is advisedly set to fully accommodate a preselected level of average load upon the actuator. The hydraulic circuit importantly includes check valves, with a pilot-operated check valve interposed between the power integrator and the accumulator and another pilot-operated check valve interposed between the power integrator and the load actuator. The pilot-operated check valves cooperate with other check valves to assure automatic transfer of hydraulic fluid under pressure from the accumulator to the load actuator, and vice versa, as may be determined by selected control of or via the power integrator. The system of check valves also cooperates with pump action to assure that adequate fluid is drawn from a sump and is deliverable for pilot-operated functions; stated in other words, with minimum reliance upon the sump, the system provides maximum conservation of energy in effecting such transfer of pressurized fluid, from and to the accumulator, as may be involved in any controlled lift or descent of any load, within the capacity of the system.

39 Claims, 7 Drawing Figures

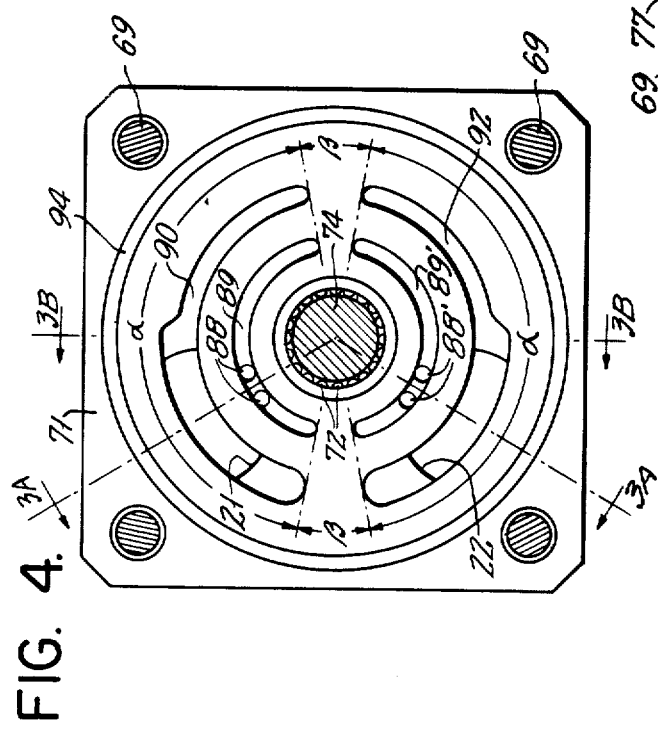

HYDRAULIC LIFT MECHANISM

RELATED CASE

This application is a continuation-in-part of application Ser. No. 570,590, filed Jan. 13, 1984 now abandoned.

BACKGROUND OF THE INVENTION

The invention relates to hydraulic lift mechanism and in particular to such mechanism as is required to serve intermittent alternating vertical displacement of a load, wherein the load may be of various magnitudes within the capacity of the mechanism. Such conditions exist for hydraulically operated cranes and hoists such as fork lifts, and for hydraulic elevators.

Conventional cranes and hoists employ a prime mover such as a diesel engine or one of various types of electric motor, depending upon the design capacity of the involved lift system, and the rated power of the prime mover is conservatively selected for assured handling of the maximum rated load of the system. In most cases, the system further requires a gearbox, a speed reducer, a pulling drum and a safety brake. Illustratively, for example, a crane with a 1-ton lift capacity (at one meter/second) requires a prime mover of 15 horsepower, and a crane with 10-ton lift capacity (at the same one meter/second) requires a prime mover of 150 horsepower.

Conventional electric-motor driven elevators are known as traction elevators. They rely on cable suspension of an elevator car from one side of a drive sheave at the upper end of the elevator shaft, with a counterweight suspended by the same cable from the other side of the drive sheave, the counterweight being designed to at least offset the weight of the car, so that theoretically the prime mover need only supply power adequate to handle loads up to the live-load capacity of the system. As a practical matter, however, such elevators must meet a requirement for fast initial acceleration from a dead start; this requirement calls for relatively high current-handling capacity so that the prime mover must be of substantially greater capacity, e.g., three times the capacity required to move the load after its initial acceleration to design running speed.

By contrast, the car of a conventional hydraulic elevator is at the upper end of an elongate vertical drive piston, operating in an elongate cylinder beneath the low end of the elevator shaft. There is no equivalent to the counterweight of a traction elevator. The prime mover for upward displacement of the car is an electric motor to drive a pump, for drawing hydraulic fluid from a sump reservoir and delivering the same via suitably controlled valve means to the head end of the cylinder; descent proceeds gravitationally via suitably controlled valve means in a throttling-flow connection to the sump from the head end of the cylinder. The net result is that prime-mover power must always be of sufficient capacity to elevate maximum load on the system, at specified conditions of speed and initial acceleration.

As far as I am aware, Bailey, U.S. Pat. No. 269,994 of 1883 is alone in suggesting that a hydraulic accumulator could serve to counterbalance a rotary pump-driven hydraulic-elevator system on the basis of an average live-load on the load-positioning hydraulic cylinder of the system. But Bailey's system was susceptible to irretrievable leaks (outside his system) via the reversibly driven gear pump he proposed to use between the accumulator and the load-positioning cylinder, so that if the elevator car were to assuredly hold stationary at a given floor-landing elevation, it would be necessary to close two shut-off valves, one on each side of the Bailey gear pump, in that the Bailey disclosure of an unillustrated brake to hold the pump cannot be a means to hold the car, due to the unavoidable leakage. Moreover, the Bailey disclosure provides no suggestion of means to replenish hydraulic fluid lost by leakage.

BRIEF STATEMENT OF THE INVENTION

It is an object of the invention to provide improved hydraulic lift-positioning mechanism of the character indicated, with great economy of prime-mover power, for a given system-load capacity.

A specific object is to achieve the above object in a fully hydraulic system which will hold a given selected load elevation and which thus obviates the need for auxiliary braking and/or shut-off devices.

It is also a specific object, particularly in the case of hydraulic-elevator systems, to provide hydraulic control mechanism meeting the above objects and adaptable, both to new installations and as a conversion of an installed existing system, the mechanism being adaptable to conventional electric controls, such as floor-directing buttons in the car and at floor landings, and multiple-speed operation including smooth acceleration from and deceleration in approach to floor levels.

Another specific object, particularly in the case of cranes and the like hoisting systems, is to provide precise single-lever control of load elevation and of the speed of load elevation and/or descent, in hydraulically operated hoist mechanism meeting the above objects and regardless of the instantaneous magnitude of the load, within the lift capacity of the system.

A general object is to meet the above objects with simplified structure, at reduced overall initial expense, and inherently characterized by materially reduced operating cost.

The invention achieves the foregoing objects in hydraulic-lift mechanism which employs what I term a power integrator in the connection between a charged hydraulic accumulator and the actuator for a vertically positionable load; the power integrator, additionally, has a prime-mover connection, and the pressurized charge of the accumulator is advisedly set to fully accommodate a preselected level of average load upon the actuator. The hydraulic circuit importantly includes check valves, with a pilot-operated check valve interposed between the power integrator and the accumulator and another pilot-operated check valve interposed between the power integrator and the load actuator. The pilot-operated check valves cooperate with other check valves to assure automatic transfer of hydraulic fluid under pressure from the accumulator to the load actuator, and vice versa, as may be determined by selected control of or via the power integrator. The system of check valves also cooperates with pump action associated with rotation of the power integrator, to assure that adequate fluid is drawn from a sump and is deliverable for pilot-operated functions; stated in other words, with minimum reliance upon the sump, the system provides maximum conservation of energy in effecting such transfer of pressurized hydraulic fluid, from and to the accumulator, as may be involved in any controlled lift or descent of any load, within the capacity of the system.

Various illustrative embodiments are disclosed for different prime-mover and load situations, and also for various embodiments of manually operated control and remotely operative electric control.

A power integrator, as contemplated herein, is a rotary liquid displacement device having two spaced flow-connection ports and an interposed rotor with externally accessible shaft connection to the rotor, and the expression "rotary" as used herein in connection with such a device is to be understood as including various known rotary-pump structures, such as gear-pump and sliding-vane devices, as well as axially reciprocating and radially reciprocating configurations, wherein rotor-shaft rotation is related to hydraulic flow into one port and out the other port. In other words, for purposes of the invention, such "rotary" devices provide for such hydraulic flow, and they provide for an external input/output torque-response relation to the hydraulic flow.

DETAILED DESCRIPTION

The invention will be illustratively described in connection with the accompanying drawings, in which:

FIG. 3 is a generally longitudinal sectional view of a power-integrator component of either of the circuits of FIGS. 1 and 2;

FIG. 4 is a sectional view taken at 4—4 in FIG. 3, with indication of a section alignment 3A—3A applicable to a first longitudinal span A in FIG. 3, and a second section alignment 3B—3B applicable to a second longitudinal span B in FIG. 3;

FIG. 5 is a sectional view taken at 5—5 in FIG. 3;

Figure 1:
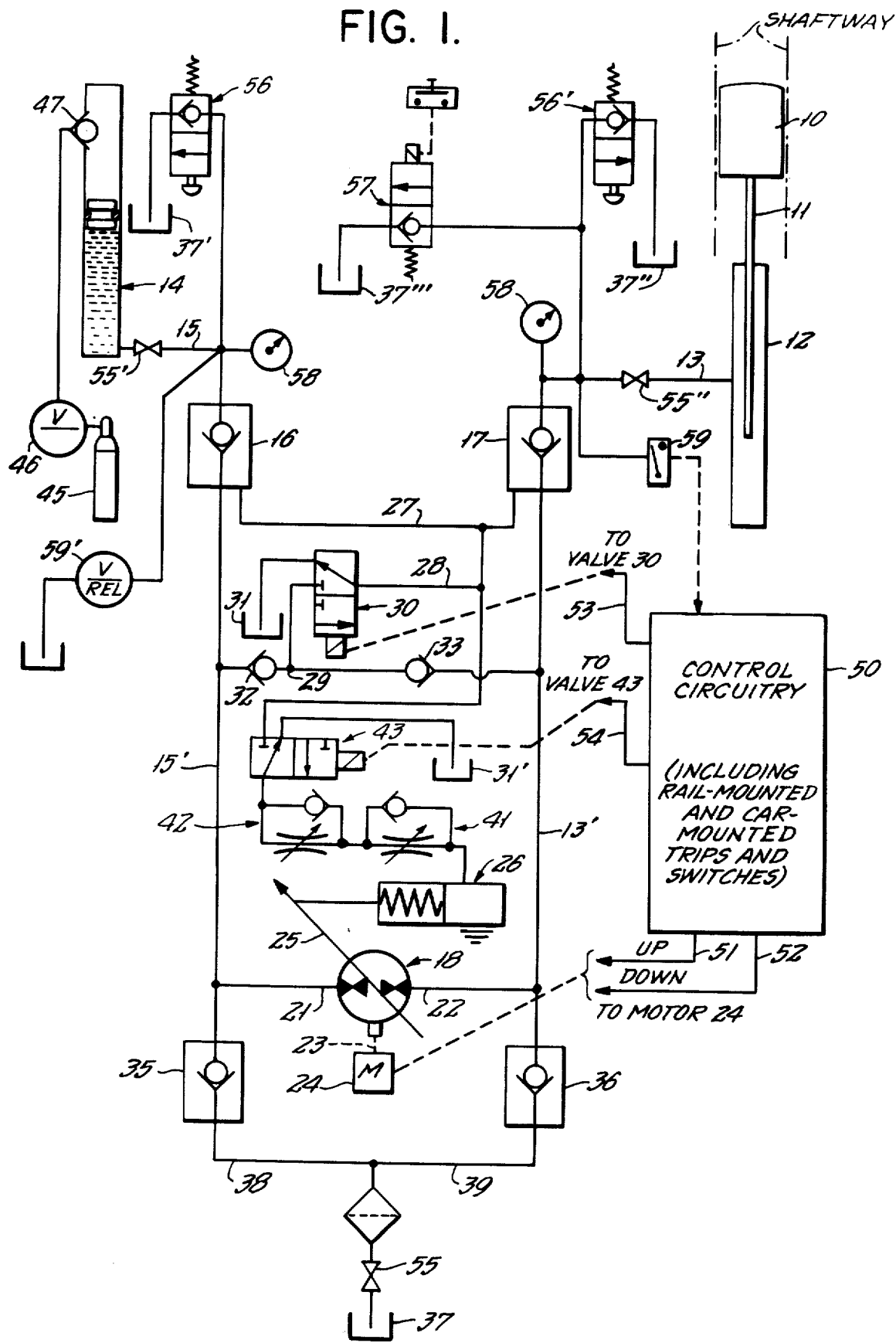
FIG. 1 is a hydraulic-circuit diagram schematically illustrating a hydrulic-elevator system embodying the invention, wherein the prime mover is reversible and the actuator is a conventional car-lifting cylinder.

Referring to FIG. 1, the invention is first illustratively shown in application to a hydraulic-elevator system wherein a car 10 will be understood to be suitably guided by rails (not shown) of a vertical shaft serving a plurality of floor-landing levels. As is conventional, car 10 receives its vertical displacement and positioning from below via the upper end of an elongate ram (piston) 11 and fixed cylinder 12, with pressurized hydraulic fluid therefor being provided via a line connection 13 to cylinder 12. But from this point on, all similarity to conventional hydraulic drive and control ceases.

In accordance with the invention, a charged hydraulic accumulator 14 is employed as a "counter-weight", continuously operative upon fluid in line 13 to cylinder 12 to effectively balance the dead load of car 10 and piston 11, plus a selected liveload magnitude which is selected to be intermediate zero live load and full-rated live load, and generally one half the full-rated live load. More specifically, a line 15 for hydraulic flow to or from accumulator 14 is connected to the line 13 for hydraulic flow from or to cylinder 12 via pilot-operated check valves 16–17 oriented to check hydraulic flow from accumulator 14 and from cylinder 12 respectively, in the absence of a pilot-operated opening of one or the other of these valves 16–17; and a power integrator 18 is interposed between lines 15'-13' served by the respective check valves 16–17. The power integrator 18 is a rotary-displacement device having first and second flow-connection ports 21–22, to which lines 15'-13' are respectively connected, and an interposed rotor has externally accessible shaft connection 23 to a prime mover such as a reversible electric motor 24. As shown in FIG. 1 (see arrow 25) and to be later described in detail in connection with FIGS. 2 and 3, the power integrator 18 is (in the FIG. 1 hydraulic-elevator situation) desirably a variable flow device, wherein variation in flow is a function of piston displacement of a hydraulic actuator 26, also to be later explained in connection with FIGS. 2 and 3.

At present, it is preferred that pilot opening of the respective check valves 16–17 be in response to a single actuating pressure. Thus, a line 27 establishes parallel connection of the respective pilots of check valves 16–17, and the circumstance of sufficient hydraulic pressure in a control line 28 is operative to dislodge both check valves 16–17 from their normally closed condition. This line-28 control connection additionally includes a solenoid-operated valve 30 which is normally positioned to discharge pressure fluid in line 28 to sump, symbolized at 31, but which is solenoid-actuable to enable pressure fluid in either of the integrator-port lines 13'-15' to pass via line 28 for concurrent pilot-driven opening of both check valves 16–17, there being isolation check valves 32–33 (connected back-to-back at 29 to valve 30) to assure integrity of the described pilot-operating connection 28.

Two further check valves 35–36, in separate lines 38–39 of connection from a reservoir or sump 37 to the respective port connections 21–22 of the power integrator, are operative to assure an initial supply of hydraulic fluid to the power integrator, no matter what the initial direction of drive from motor 24; specifically, each of the check valves 35–36 is oriented to check or block any flow in the direction of reservoir 37.

Recital of important operating components is completed, at least for purposes of initial description of typical hydraulically controlled operation, by identifying at 41–42 separately adjustable throttling orifices for respectively smoothly accelerating and smoothly decelerating drive to car 10, pursuant to operation of a solenoid valve 43 via cam-operated limit-switch functions normally available for controlled smooth departure from and approach to a given level of elevator landing; such limit-switch devices and their operation are not necessary to an understanding of the present invention and are therefore not shown in FIG. 1.

A brief operating description may now be given for the circuit of FIG. 1, which will be recalled is an illustration of a first mode of use of the invention, namely involving a variable-flow power integrator (18) in combination with a reversible (bidirectionally operable) electric motor (24) as the prime mover.

Initially, one may assume a filled system wherein car 10, its load and piston (ram) 11 are locked at a particular floor level, by reason of ram pressure in line 13 forcing closure of check valve 17; and it will be understood that a charge of pressurized gas (e.g., nitrogen) will have been supplied (as from a commercial container 45, via a throttle valve 46 and a check valve 47) to the upper end of accumulator 14 over an adequate volume of hydraulic fluid, the gas pressure being retained by check valve 47 and the hydraulic outlet 15 of the accumulator being blocked and held, by forced closure of check valve 16. Even though the live load may have changed at the floor level, the accumulator pressure against check valve 16 and the ram pressure against check valve 17 will be very nearly the same, being slightly greater at check valve 17 if the live load happens to be greater than average, and being slightly greater at check valve 16 if the live load happens to be less than average. By contrast, pressure on the other sides of check valves 16–17 will have been relieved, first, by the normal (i.e., unactuated) state of valve 30 wherein pilot-operating pressure in line 28 is vented to sump 31, and by the normal (i.e., unactuated) state of valve 43 wherein the volumetric-rate control actuator 26 is vented to sump 31' as the compressionally loaded spring of actuator 26 returns integrator control 25 to a near-zero volumetric-rate setting; secondly, unavoidable minor leakage at the shaft seal of integrator 18 (e.g., to sump 37 via a drain connection, not shown) will have relieved pilot-actuating pressures in lines 13' and 15'.

Let it be assumed that car 10 is to be raised from a lower landing to an upper landing. For this purpose, conventional electrical-control circuitry 50 will be available, the same being understood to include car-mounted and landing-mounted button controls whereby appropriately directional excitation is supplied (via an UP control line 51) to motor 24, causing integrator 18 to function as a low-volume pump of hydraulic fluid into port 21 and out of port 22. The suction involved in such pump action immediately and for a brief instant draws an increment of hydraulic fluid from reservoir 37 via line 38 and its associated check valve 35. This action is brief and the drawn increment is small because lines 13'–15' were already full, so that the drawn increment quickly builds pilot-operating pressure via line 13'; at the same time, the control circuitry 50 will be understood to provide a solenoid-operating signal in a line 53 to valve 30, whereby pilot-operating pressure in line 13' is delivered via lines 28–27 to both check valves 16–17, thus opening both check valves 16–17. Once only partially opened, check valve 16 admits full accumulator pressure to line 15', thereby closing check valve 35 and presenting accumulator pressure to port 21 of the integrator; similarly, when check valve 17 begins to open, full ram (load) pressure is established in line 13', thereby assuring continued closure of check valve 36 and presenting ram pressure to port 22 of the integrator.

Once motor 24 and valve 30 are actuated, both check valves 16–17 are held open, allowing port 21 to assume instantaneous accumulator pressure and port 22 to assume instantaneous ram pressure. Motor 24 continues to run, because hydraulic fluid must be displaced from the accumulator to the ram cylinder 12 in the desired process of elevating car 10 and its contents. If the live load in car 10 is less than average, accumulator pressure at port 21 will exceed ram pressure at port 22, so that accumulator pressure alone will be sufficient for upward displacement of car 10; in this event, the fluid-displacement response of the rotor of integrator 18 will develop a torque by which motor 24 becomes a generator, feeding a quantum of electrical energy back into the supply grid. If on the other hand, the liver load is greater than average, motor 24 will remain a prime mover for pump action in the integrator, raising inlet accumulator pressure at port 21 to a greater level at port 22 while also displacing a driving flow of hydraulic fluid from the accumulator to the ram cylinder.

It has been indicated that at the start of motor 24, integrator 18 was at its low-volume rate setting, in that actuator 26 had been vented to sump 31'. This, of course, means that initial car movement was slow (smooth initial acceleration). To then achieve faster running speed for the car, the control circuitry 50 will be understood to include a further control line 54 connected to actuation of valve 43 at predetermined short time delay after motor start and after actuation of valve 30. Once valve 43 is actuated, metering orifice 41 becomes determinative of the rate at which accumulator pressure (in line 28) can drive actuator 26 to a full volumetric setting (25) of integrator 18, at which point of course car 10 is being propelled at maximum speed; this rate of actuating displacement at 26 will be understood to be determinative of smoothness of acceleration of car speed. In like fashion, upon approach to the selected upper level of car landing, conventional switch and/or trip devices (comprehended by the control circuitry 50) will be understood to terminate the signal in line 54, thus deactivating valve 43 and allowing fluid to bleed from actuator 26 to sump 31' at a rate determined by the orifice setting at 42; in such case, smooth deceleration is achieved in approach to the destination landing level, as the compression spring of actuator 26 discharges fluid and restores the volumetric-control setting 25 to the low-volume condition of integrator 18.

It will be seen that in the described upward travel of car 10, accumulator 14 acted as a counterweight, and that torque needed at or generated by the rotor shaft of the integrator was a function of the instantaneous difference in pressure at ports 21–22. The power required of motor 24 is primarily a function of the desired maximum flow of hydraulic fluid (oil). Thus, for the case of a typical car 10 having a deadweight of 2500 pounds and a rated live-load capacity of 5000 pounds, the accumulator setting (charge pressure, regulated at 46) is preferably set to balance the car with half the rated live load. In this circumstance, and for a maximum desired car speed of 120 ft/min, there is at most a 7-horsepower requirement of motor 24, and this is to be compared with the 25 horsepower required of a conventional hydraulic elevator having the same conditions of load capacity and travel speed.

For downward travel of car 10 from an upper-floor level to a lower-floor level, operation is similar to the described upward movement, although motor 24 is excited for rotation in the reverse direction, through a control signal via line 52 from the control circuitry, calling for fluid displacement through the integrator in the direction from port 22 to port 21. An increment of hydraulic fluid is initially and quickly drawn from reservoir 37 via line 39 and its check valve 36, allowing pump action at 18 to build pressure in line 13' to at least match accumulator pressure; at the same time, a travel-start signal in line 53 will have actuated valve 30, so that built-up pressure in line 15' can be delivered via line 28 for a pilot-driven opening of both check valves 16–17. Ram pressure thus is applied via line 13' to what is now the inlet port 22 of integrator 18, and port 21 becomes the outlet via which integrator 18 returns hydraulic fluid to the accumulator. Motor 24 will consume electric energy from the supply grid, or it will return electrical energy to the supply grid, depending upon the sign of the difference between pressures at ports 21-22.

The previous description with respect to smooth acceleration from starting level and smooth deceleration on approach to the selected lower destination applies equally for the involved descent, with orifices at 41-42 governing the respective rates of displacing actuator 26 in the speed-increasing and speed-decreasing directions, as the same are the reflection of adjusted increase and decrease in the volumetric capacity of integrator 18.

The described circuit will slowly lose its content of hydraulic fluid, due to unavoidable oil leakage, which is preferably gravitationally returned to a reservoir, as to sump 37. Such leakage, however slight and however slow, requires the hydraulic system to have a replenishing mode, which is preferably automatic and governed by a sensor (not shown) of hydraulic level in the system. For example, the circuitry 50 may include means for starting motor 24 (via line 52) in the DOWN direction, said means being responsive to a sensed need for replenishment and temporarily disabling any actuation of the drive-start valve 30. In that event, motor 24 causes integrator 18 to pump replenishing fluid from reservoir 37 (via check valve 36), into line 15' and thence into the accumulator (via check valve 16) until the sensor indicates that desired replenishment has been completed, whereby the control circuitry to valve 30 is restored to operability, and the system is fully reconditioned. A suitable replenishment system is not shown in FIG. 1, but will be described later in connection with FIG. 6.

Other components of the circuit of FIG. 1 will be recognized for their safety and/or maintenance purposes. For example, manual shut-off valves (stops) at 55-55'-55" enable isolation of control components from hydraulic fluid at reservoir 37, at accumulator 14, and at ram cylinder 12, respectively. Manually operated drainage to reservoir (sump) 37 is available via valves 56 (accumulator side) and 56' (ram side) via local sump receptors 37'-37", and push-button operation of a solenoid valve 57 enables a jogged emergency descent of car 10 through jogged release of ram pressure and fluid to a sump receptor'''; a pressure-responsive switch 59 responds to a detected overload condition in the ram cylinder, to deliver a "stop-operations" command signal to the control circuitry 50. Pressure indicators at 58-58' enable accumulator and ram pressures to be continuously observable, the indicator 58 being also used when operating valve 46 to charge the accumulator with gas to a predetermined pressure level. And pressure relief for accumulator pressure is available via a sump-connected relief valve 59'.

Figure 2:
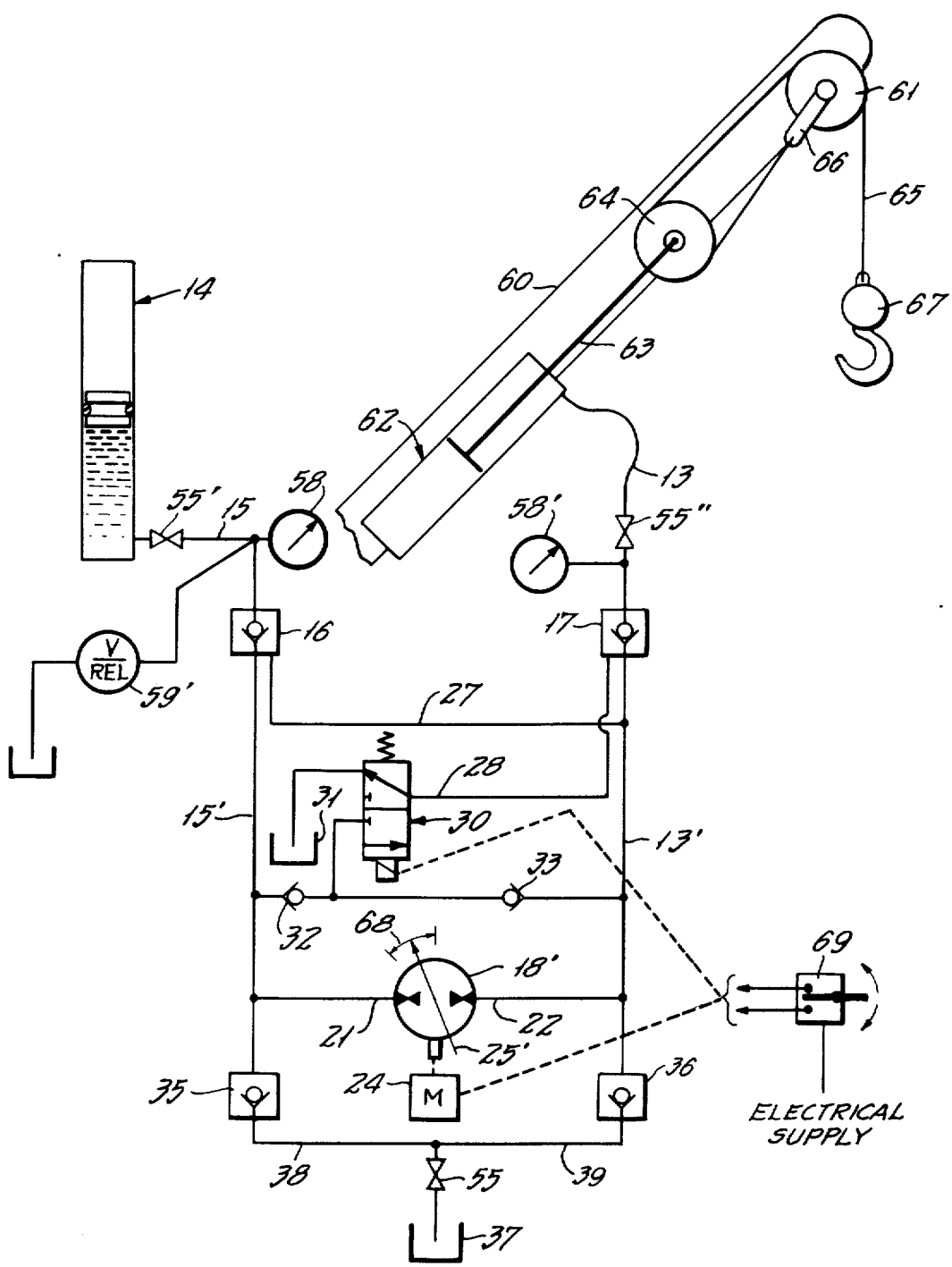
FIG. 2 is a diagram to show a circuit, as in FIG. 1, for operating a crane or the like hoist, wherein the actuator is a traction cylinder.

The arrangement of FIG. 2 is illustrative of the invention in application to a crane having a boom 60, at the upper end of which a suspension pulley 61 is mounted for rotation. A traction cylinder 62 is mounted to a lower region of boom 60, with the rod 63 of its piston extending upward and carrying another pulley 64 at its upper end. Rod (63) displacement is doubled by tethering one end of suspension cable 65 to a bail or other fastening 66 at the upper end of boom 60 and by coursing the cable over both pulleys 64-61, the suspended end of the cable being terminated at a hook 67. Hydraulic control circuitry for counter-weighted displacement of hook 67 is served via a line 13 connection to the tail end of cylinder 62 and may be very much the same as shown and described for the hydraulic elevator of FIG. 1. There are, however, some simplifications because automatic control of displacement and of acceleration/deceleration is not needed in the simple crane situation depicted in FIG. 2. But to the extent that already described components serve the crame control of FIG. 2, there is no need for further description and, therefore, the same reference numbers have been used.

The FIG. 2 system uses a variable-flow power integrator (as at 18 in FIG. 1), but control of volumetric-rate may be by manual (e.g., servo-assisted) operation, symbolized at 25'; the integrator of FIG. 2 is identified 18', and its range of manual adjustment, from zero to maximum speed is suggested for an arcuate span 68, it being understood that the direction of traction-cylinder displacement is a function of selecting the direction of excitation to reversible electric motor 37. The latter selection of direction may be via a finger-operated selection switch 69 piggy-backed to the speed-control lever 25', although for simplicity in FIG. 2, switch 69 is separately shown; and a dashed-line connection from the motor-start control 69 will be understood to indicate that valve 30 is actuated upon a starting of the motor. Finally, noting that hook 67 is deadweight and generally amounts to about 10 percent of the capacity of the crane, it is recommended to adjust the pressurized charge on hydraulic fluid within accumulator 14 so as to counterbalance the traction cylinder at approximately 50 percent of the variable live load capacity, namely, at 55 percent of the rated capacity (deadweight plus live weight) of the crane.

The power integrator 18 described in connection with the elevator system of FIG. 1 (and usable also in the crane system of FIG. 2) is shown in detail in FIGS. 3, 4 and 5 and will be recognized for its similarity to a conventional sliding-vane rotary pump. But there are important differences arising from the fact that integrator 18 must operate both as a hydraulic pump and as a hydraulic motor, and with equal facility whichever direction has been selected for rotation of the reversible electric motor 24.

As shown, integrator 18 is contained within a housing body 70 with fitted removable end closures 71-71', being clamped to body 70 by bolts 69. Spaced bearings 72-73 provide spaced regions of journal support for a rotor shaft 74, one end of which projects externally for keyed coupling to the shaft 23 of motor 24. A rotor 75 is locked to shaft 74 (as by keyed or splined engagement, or by forging, effectively into a single integral piece) and is characterized by plural radial slots for radially-guided positioning of vanes 76. Within the cavity 77 of the housing body 70, a cylindrically annular cam ring 78 surrounds rotor 75 and its vanes 76, and ring 78 is mounted for selective positioning (along the horizontal, in the sense of FIG. 5) to varying degrees of eccentricity with respect to the axis of rotor 75 and its shaft 74; such mounting is shown to include diametrically opposed parallel race flats 79 on ring 78 and corresponding flats 79' on housing-body inserts, with interposed sets of needle-roller bearing elements 80 therebetween.

Eccentric adjustment is made to the full extent of eccentricity variation involved, from a minimum volumetric-displacement position (near but not at zero eccentricity), to the position of maximum eccentricity shown in FIG. 5 for a maximum volumetric-displacement setting of integrator 18. The pressure-responsive volumetric-rate actuator 26 of FIG. 1 is a built-in feature of the integrator of FIGS. 3 to 5. This involves a piston element 83 guided in a removable body block 81, for horizontal-displacing contact with cam ring 78, in response to hydraulic pressure admitted at a port 84.

Such displacement is against the resilient pre-loaded reaction of a compression spring 85 acting through a guided shoe in another removable body block 82 on the diametrically opposite side of cam ring 78. Lock-nutted adjustment of a first threaded rod 86 enables a stop to be set at a predetermined maximum volumetric-rate position of cam ring 78, and similar adjustment of a second such rod 87 enables a similar stop to be set for the predetermined minimum volumetric-rate position of cam ring 78. Preferably, blocks 81–82 have identical threaded and sealed engagement in opposed bores of body 70, for more ready adaptation to confined spaces peculiar to particular installation situations.

Priming pressure for radially outwardly loading all vanes 76 into continuous contact with the bore of cam ring 78, regardless of the direction of rotation of rotor shaft 74, is available from the respective ports 21–22 of integrator 18, shown as formations of the closure member 71. For the rotor vanes 76 which at any given instant in the upper semi-cylindrical half of the bore of cam ring 78, such priming pressure is provided by fluid at port 21, via a passage 88 to an almost semi-circular circumferential groove 89 in the body-closure member 71; groove 89 is shown in FIG. 4 to have manifolding communication with individual axial passages serving radially inner ends of the respective vanes 76, throughout the almost semi-circular upper span $\alpha$. In similar fashion, for the rotor vanes 76 which at any given instant in the lower semi-cylindrical half of the bore of cam ring 78, such priming pressure is provided by fluid at port 22, via a passage 88' to a like but diametrically opposed almost semi-circular circumferential groove 89' in closure member 71' groove 89' is shown to have manifolding communication with individual axial passages serving radially inner ends of the respective vanes 76, throughout diametrically opposite almost semi-circular lower span, of like extent $\alpha$. Preferably, the spacing $\beta$ between adjacent ends of arcuate manifolding grooves 89–89' approximates the angular spacing of adjacent vanes 76, and grooves 89–89' are angularly coextensive with the respective pump/motor action grooves 90–92. Finally, an upper arcuate port slot 90 in body-closure member 71 (1) is partially closed by radial lap with cam ring 78, (2) is swept by vanes 76 in the course of shaft (74) rotation, and (3) has direct communication with integrator port 21; in like manner, a lower arcuate port slot 92 in body-closure member 71 (1) is partially closed by radial lap with cam ring 78, (2) is swept by vanes 76 in the course of shaft (74) rotation, and (3) has direct communication with integrator port 22. Port slots 90–92 are in opposed symmetry about the shaft (74) axis and are of progressively increasing radial width, as shown in FIG. 4; the horizontal plane which includes the shaft (74) axis is the plane of symmetry, in view of the described horizontally guided direction of eccentricity adjustment for cam ring 78. And for greatest assurance of the described delivery of priming pressure to vanes 76, the axially inner face of the other closure member 71' is shown to be formed with upper and lower manifolding grooves 91–91' of arcuate extent $\alpha$ and in angular register with grooves 89–89', as well as with pump/motor action grooves 93–93' of arcuate extent $\alpha$ and in angular register with grooves 90–92.

It will be seen from the foregoing description that the integrator of FIGS. 3, 4 and 5 responds equally, whichever the direction of flow through ports 21—22 for any given setting of the cam ring 78. In one flow direction, symbolized by a heavy arrow at port 21 in FIG. 3, port 21 is the inlet serving vanes in the upper arc of port slot 90 for shaft (74) rotation which is counterclockwise in the sense of FIG. 4; in this situation, the device 18 acts as a hydraulic pump on the discharge side 22 and as a hydraulic motor on the inlet side 21. For the opposite flow direction, symbolized by the arrow at port 22 in FIG. 2, port 22 is the inlet serving vanes in the lower arc of port slot 92 for shaft (74) which is clockwise in the sense of FIG. 4; and in this latter situation, device 18 acts as a hydraulic pump on the discharge side 21 and as a hydraulic motor on the inlet side 22. In any event, regardless of the direction of flow as between ports 21 and 22, the port-to-port pressure difference is either increased or decreased or is zero. Whatever the rotational direction, the connections 88–88' (89–89') provide priming pressure urging all vanes into radially outward contact with the bore of cam ring 78. Also, whatever the rotational direction, the instantaneous eccentric setting of the cam ring determines the volumetric rate of the integrator.

Figure 6:
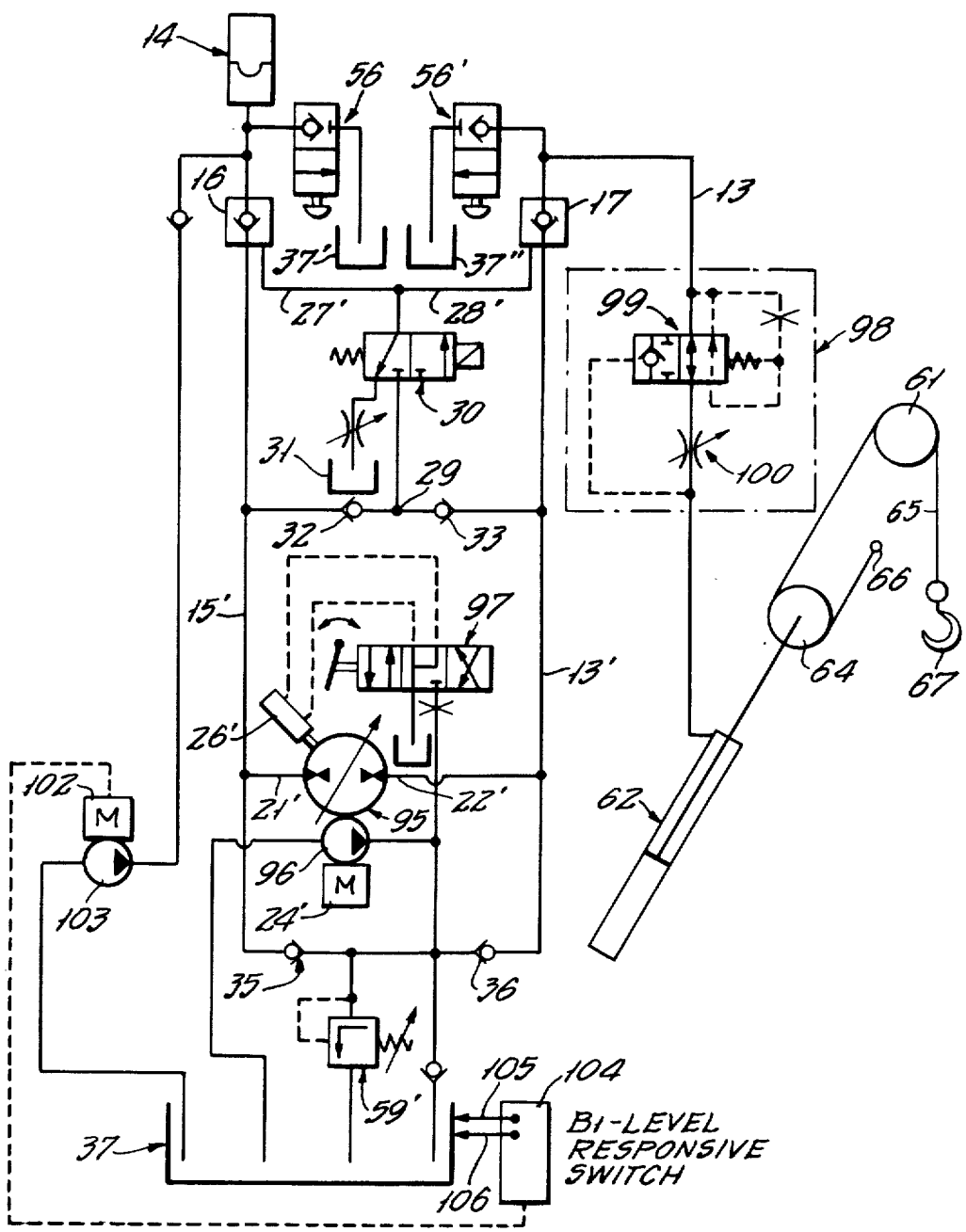
FIG. 6 is a view similar to FIG. 1, to show a modification of the hydraulic circuit of FIG. 1, wherein the prime mover is unidirectional.

The crane-hoist circuit of FIG. 6 is intended for heavier-duty application than that of FIG. 2, but many of the component functions remain the same and therefore the same reference numerals identify corresponding parts; also, the same reference numerals with further-primed notation in certain cases identify analogous components. The principal difference involved in the heavier-duty system of FIG. 6 is that the prime mover 24' is unidirectional, being illustratively a diesel engine or a unidirectional electric motor. FIG. 6 also is used to illustrate a fluid-replenishment system usable with all of the hydraulic-circuit embodiments disclosed in the present patent application.

The integrator 95 of FIG. 6 is analgous to what has been discussed for use in FIGS. 1 and 2, but in view of the heavier-duty and unidirectional conditions applicable in the FIG. 6 system, it is preferred to rely upon a rotary hydraulic displacement device which is piston-acting in nature, as for example a variable-displacement axial-piston pump wherein a rotated swash plate is adjustably inclined with respect to the axis of rotation to determine not only the adjusted magnitude of the volumetric rate but also the flow direction between ports 21'-22' for which the volumetric rate has been selected; alternatively, the integrator 95 may be a variable-displacement radial-piston pump wherein the volumetric rate is similarly adjustable for essentially constant-speed rotation of a rotor element. Adjustment of the volumetric rate is schematically shown to be governed by a double-acting cylinder 26', and for this purpose, I provide an auxiliary pump 96 of relatively low capacity (i.e., relative low volume and low pressure delivery), drawing upon reservoir 37 for its supply of hydraulic fluid and utilizing a manually operable three-position selector valve 97 for operation of the double-acting cylinder 26'. For the neutral position of valve 97, there is no actuation via cylinder 26', but the selected end position of valve 97 will determine whether pressure fluid initially supplied by pump 96 will shift the integrator 95 to full-volumetric rate in the flow direction from port 21' to port 22' (causing lifting displacement of hook 67), by reason of fluid transfer from accumulator 14 to the traction cylinder 62, or whether integrator 95 will be shifted to full volumetric rate in the opposite flow direction, from port 22' to port 21' (causing descent of hook 67) and return of system fluid to accumulator 14.

In FIG. 6, both pilots are again served by the same single source of operating pressure, available in lines 27 and 28 upon actuation of solenoid 30, which actuation will be understood to be interlocked (by means not shown) with operation of the prime mover 24'.

As a safety feature, to forestall the free fall of hook 67 and its load in the event of a breakage or other failure in line 13 to the traction cylinder 62, block 98 schematically illustrates a so-called parachute valve 99 which responds to a drop in pressure (across an orifice 100) by placing a check valve in the connection to cylinder 62, thus blocking cylinder 62 against further fluid discharge. It will be understood that the block 98 is advisedly mounted adjacent cylinder 62, preferably as a piggy-back feature secured to cylinder 62.

In FIG. 6, as with all other hydraulic controls presented herein, the primary sump is reservoir 37, into which all sump receptors drain, to the end that all hydraulic fluid be conserved throughout the system. The total volume of hydraulic fluid in the system is always the sum of the liquid contents (A) of accumulator 14 and (B) of traction cylinder 62 and (C) of reservoir 37, and the lines connecting these components always contain a constant further volume (D) of minor magnitude. The level in reservoir 37 is thus always a true measure of the sum of volumes A, B and D, which sum must be maintained within predetermined limits if the described hydraulically counterweighted systems are to remain operative indefinitely. It is a feature of the invention that reservoir 37 be initially supplied with a given minimum level of hydraulic fluid, and that one or more levels about this minimum level be monitored to determine whether and when the motor 102 for a pump 103 shall be operated to draw fluid from reservoir 37 and feed the same in line 104 to replenish the supply at accumulator 14. For this purpose, a sensor of predetermined maximum level and as associated electric switch (with suitably adjusted ON-time capability) would suffice to control excitation of pump motor 102. However, in the form shown, a switch 104 is connected to supply a motor-drive signal commencing upon detection of the predetermined maximum level by an upper-level sensor 105 and to terminate the motor-drive signal upon detection of the predetermined minimum level by a lower-level sensor 106. Since pressure in accumulator 14 is always close to the same magnitude, it is of no consequence to the hydraulic-counterweight nature and operation of the lifting mechanism whether load-displacement is or is not in progress at the time of automatic replenishment, to assure constancy of the sum of volumes A, B and D, within predetermined limits.

Figure 7:
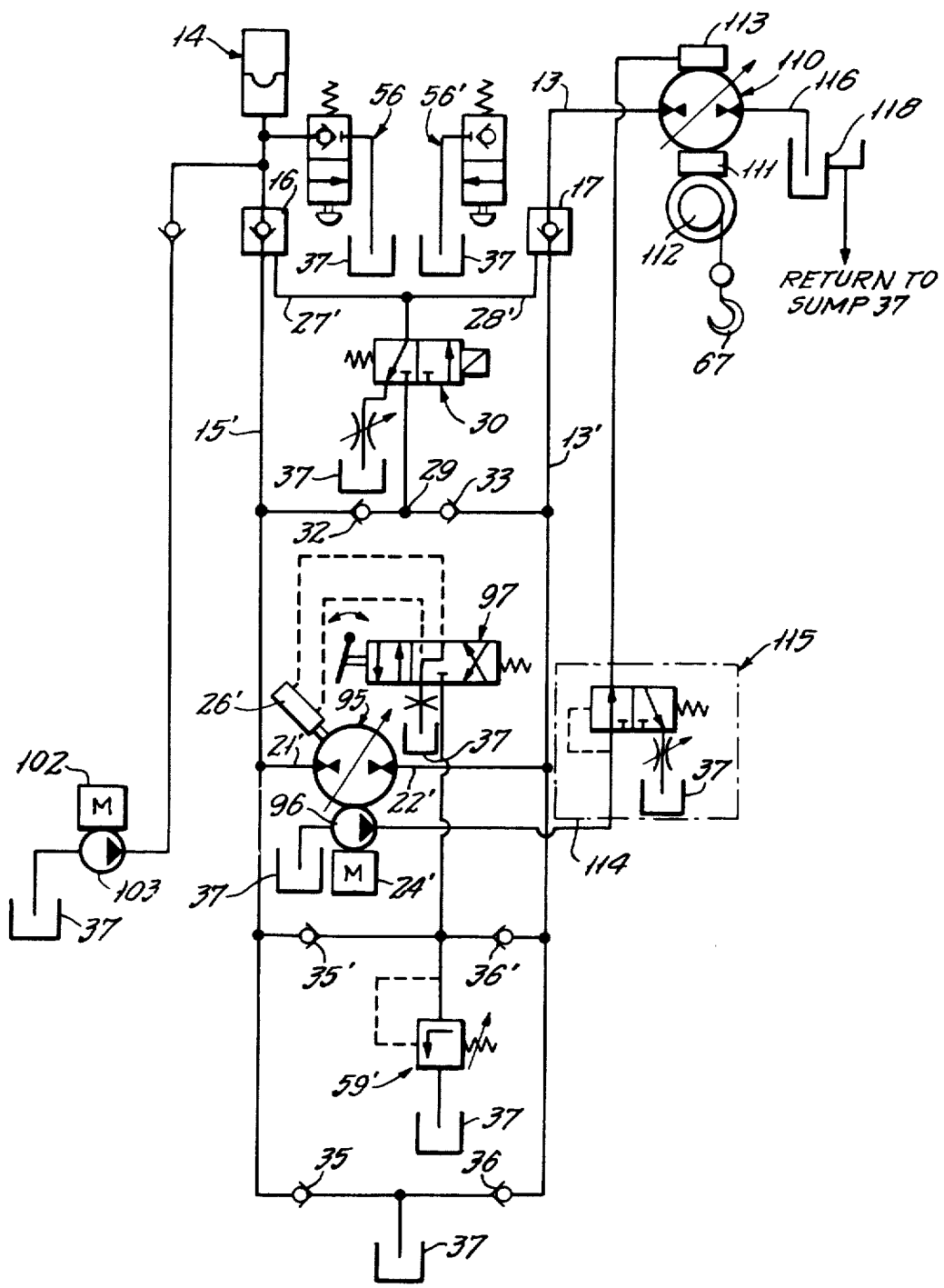
FIG. 7 is a schematic hydraulic circuit diagram to show application of the invention to operation of the load via a hydraulic motor.

The hydraulic circuit of FIG. 7 is like that of FIG. 6, except for the primary fact that it is illustrative of use of the invention to operate a rotary hydraulic motor 110 (through speed-reducing means 111) to drive a rope winch or drum 112 for vertical positioning of hook 67 and its load. Motor 110 may be a fixed-delivery motor, but in FIG. 7 the control arrow through the symbol for motor 110 indicates that motor 110 may alternatively be a variable-delivery device. In view of its rotary character, motor 110 exhibits at least some leakage, and therefore it cannot be hydraulically locked at a desired hook (67) elevation; for this reason, motor 110 is shown equipped with braking means 113 which sets automatically to lock the shaft of motor 110 whenever no flow is desired in line 13 but which is relieved in response to actuating pressure developed in a control line 114 by the low-capacity pump 96, i.e., upon operation of pump 96. Such supply line 114 is operative to shift an autopilot valve 115 to the position shown in FIG. 7, wherein brake-relieving pressure becomes available at 113. Any failure of pressure in the hydraulic circuit of line 114 will cause pressure at the outlet of valve 96 to drop to zero, thus allowing valve 115 to reset via spring action to its position of draining brake-relieving fluid to sump 37; a throttling orifice in the connection of valve 115 to sump will be understood to enable a degree of cushioning action in any resetting of brake 113 in the indicated circumstance of failure in the circuit of line 114.

FIG. 7 also serves to illustrate that, in practicing the invention for the case of hydraulic-motor elevation of hook 67 and its load, provision must be made to conserve the constancy of hydraulic fluid in the system. To this end, motor 110 is shown with connection 116 to a special local sump 117 having a volumetric capacity which is at least that required for motor 110 operation over the entire design hook-lifting span; fluid is conserved by having line 117 automatically draw from sump 117 for any controlled descent of the hook and its load, thus returning operating fluid to accumulator 14. However, the nature of rotary motor 110 is that it will leak, so that in the course of time, fluid discharged into local sump 117 will accumulate to a greater extent than required for full descent of hook 67. Recognizing this as a fact, sump 117 is shown to include a spillway 118 via which fluid in excess of that required to return the hook to its fully descended position may be collected and returned to sump 37, as indicated by legend in FIG. 7. having returned spilled excess fluid to sump 37, fluid has not been lost from the system; such fluid becomes part of the system-reservoir supply and is subject to automatic replenishment operations (back to accumulator 14) as described in detail in connection with FIG. 6.

Finally, FIG. 7 provides illustration of another check-valve arrangement effective to enable a start-up draw of reservoir fluid. The primary check valves 35–36 remain as previously described, but additional and corresponding (but lower-capacity) check valves 35'–36' enable pump 96 to draw directly from its own unimpeded reservoir (37) connection, independent of whatever higher-pressure conditions may exist in lines 15'–13'. Such drawn and supplied fluid enables control valve 96 to be virtually immediately operative in its volumetric-rate setting of integrator 95, and operations proceed as previously described.

The invention and its severally described embodiments will be seen to have achieved all stated objects, with promise for dramatic economies in installation, operation and maintenance costs for hydraulic elevator and/or crane and other hoist systems. Importantly, the invention provides for total conservation of fluid in any hydraulically counterweighted system, within limits that assure automatic replenishment and thus assure continued and continuous efficient operation over the full range of loads, speeds, and displacmenets for which the given system is designed.

The particular rotary vane-type integrator of FIGS. 3 to 5 is especially attractive for hydraulic-elevator and for small to medium-load crane and hoist applications. The component parts are simple and readily accessible for servicing, inspection or repair, merely by removal of the through-bolts 69. Single O-ring seals 94–94' are all that is needed at interfaces 70/71 and 70/71', and as has already been observed, the piston and compression-spring blocks 81–82 are easily reversible, should particular installation requirements so dictate. Finally, the device is self-priming whatever the direction of shaft

(74) rotation, and whether the device is in a pump mode or a motor mode.

In the case of a squirrel-cage induction motor drive (24) of the hydraulic elevator or crane of FIGS. 1 and 2, a hydraulic pressure difference across the ports of integrator 18 in the motor (24) running direction will reflect in shaft-braking torque which means that motor 24 is operating in its hypersynchronous mode and is therefore feeding energy back into the supply grid. For example, a 60-Hz, 4-pole motor 24 of such character will have a normal synchronous no-load running speed of 1800 rpm, which will characteristically reduce to about 1725 rpm when motor 24 must supply torque to integrator 18. But in the event that the pressure difference between integrator ports is great enough in the motor (24) running direction, motor 24 can illustratively be hydraulically forced to run at 1875 rpm, in which event it will be hypersynchronous and will be returning energy to the grid.

In the present circumstances of relatively little experience with use of the invention, it is not possible to state ultimate limits or even ranges for particular circumstances of load range, displacement range, speed ranges and the like. Neither is it possible to state limits of ratios of accumulator volume to displacement cylinder or motor volume, or even gas-filled volume to liquid volume in the accumulator. However, I do know that highly satisfactory results are achievable when accumulator volume is in the range of 8 to 10 times the driven-end displacement volume, and that the total liquid volume locked in the system and shared by accumulator 14 and its connected actuator (12, 62, or 110–117) should not greatly exceed the displacement volume of the connected actuator plus a small fraction thereof (e.g., 10 percent) to assure that the float in the accumulator will remain afloat throughout all operations.

While the invention has been described in detail for various illustrative embodiments, it will be understood that modifications may be made without departing from the scope of the invention.

What is claimed is:

1. In a hydraulically operated lift system wherein a pressurized hydraulic accumulator is continuously connected to a hydraulic lift actuator and wherein a rotary liquid-displacement device is interposed between the accumulator and the actuator, said rotary-displacement device having two flow-connection ports and an interposed rotor with externally accessible shaft connection to the rotor, the improvement in which a first barrier-type pilot-operated check valve is interposed in the connection between the accumulator and one port of the rotary-displacement device and is oriented to check flow in the direction from the accumulator, and in which a second barrier-type pilot-operated check valve is interposed in the connection between the lift actuator and the other port of the rotary-displacement device and is oriented to check flow in the direction from the lift actuator, control means including a prime mover having torque-responsive connection to said shaft, and means including pilot-operating pressure connections to said check valves and responsive to rotation of said prime mover.

2. In a hydraulically operated lift system wherein a pressurized hydraulic accumulator is continuously connected to a hydraulic lift actuator and wherein a rotary liquid-displacement device is interposed between the accumulator and the acturator, said rotary-displacement device having two flow-connection ports and an interposed rotor with externally accessible shaft connection to the rotor, the improvement in which said rotary-displacement device is of the variety having selectively operable means for reversibly controlling the directio of port-to-port flow therethrough, in which a first barrier-type pilot-operated check valve is interposed in the connection between the accumulator and one port of the rotary-displacement device and is oriented to check flow in the direction from the accumulator, and in which a second barrier-type pilot-operated check valve is interposed in the connection between the lift actuator and the other port of the rotary-displacement device and is oriented to check flow in the direction from the lift actuator, a unidirectioal motor having torque-responsive connection to said shaft connection, and means including a single pilot-operating pressure connection to both said check valves, said pilot-operating pressure connection comprising a single selectively operable control valve interposed between the pilots of said check valves and and a source of pilot-operating pressure.

3. In a hydraulically operated lift system wherein a pressurized hydraulic accumulator is continuously connected to a hydraulic lift actuator and wherein a rotary liquid-displacement device is interposed between the accumulator and the actuator, said rotary-displacement device having two flow-connection ports and an interposed rotor with externally accessible shaft connection to the rotor, the improvement in which a first pilot-operated check valve is interposed in the connection between the accumulator and one port of the rotary-displacement device and is oriented to check flow in the direction from the accumulator, and in which a second pilot-operated check valve is interposed in the connection between the lift actuator and the other port of the rotary-displacement device and is oriented to check flow in the direction from the lift actuator, the pilot of said first check valve being operatively connected to the connection between the second pilot-operated check valve and the rotary-displacement device and the pilot of said second check valve being operatively connected to the connection between the first pilot-operated check valve and the rotary-displacement device, control means including a prime mover having torque-responsive connection to said shaft and a prime-mover-driven connection adapted to activate the pilots of said check valves.

4. The improvement of claim 3, in which said hydraulic lift actuator is a rotary hydraulic motor, a sump connected to receive hydraulic fluid discharge from said hydraulic motor for one direction of rotation thereof, and said sump and the motor connection thereto having sufficient volumetric capacity to return hydraulic fluid via said hydraulic motor for the other direction of rotation thereof and for the full span of hydraulic lift via said actuator; said sump having an overflow spillway connection to said reservoir, for sump-accumulator volume of hydraulic fluid beyond a predetermined quantity which is at least said volumetric capacity.

5. The improvement of claim 1 or claim 2 or claim 3, in which said prime mover is a reversible electric motor.

6. The improvement of claim 1 or claim 2 or claim 3, in which said prime mover is unidirectional, and said rotary liquid-displacement device is of the variety in which the relation between the direction of shaft rotation thereof and the direction of flow therethrough is selectively reversible.

7. The improvement in claim 1 or claim 2 or claim 3, in which said prime mover is unidirectional, said rotary liquid-displacement device is of the variety in which the relation between the direction of shaft rotation thereof and the direction of flow therethrough is selectively reversible, and in which said prime mover is a diesel engine.

8. The improvement of claim 1 or claim 2 or claim 3, in which said prime mover is unidirectional, said rotary liquid-displacement device is of the variety in which the relation between the direction of shaft rotation thereof and the direction of flow therethrough is selectively reversible, and in which said prime mover is an electric motor.

9. The improvement of claim 1 or claim 2 or claim 3, in which said rotary liquid-displacement device is of the variety in which the speed relation between shaft rotation thereof and flow rate therethrough is selectively variable.

10. The improvement of claim 1 or claim 2 or claim 3, in which said rotary liquid-displacement device is of the variety in which the speed relation between shaft rotation thereof and flow rate therethrough is selectively variable, and in which said prime mover is of a variety delivering a substantially constant-speed output and said rotary-displacement device includes means for varying the rate of hydraulic flow therethrough.

11. The improvement of claim 1 or claim 2 or claim 3, in which said rotary liquid-displacement device is of the variety in which the speed relation between shaft rotation thereof and flow rate therethrough is selectively variable, and in which said prime mover is of a variety capable of delivering a variable-speed output and said rotary-displacement device is of a variety having a fixed volumetric characteristic for hydraulic flow therethrough.

12. The improvement of claim 1 or claim 2 or claim 3 including a sump providing a reservoir of hydraulic fluid, there being a first connection including a check valve between the sump and said one port and a second connection including a check valve between the sump and said other port, each of the check valves of the respective sump connections being oriented to check against flow in the sump direction.

13. The improvement of claim 1 or claim 2 or claim 3 in which said rotary liquid-displacement device is characterized by the ports thereof having substantially equal flow-accommodating capacity independent of the direction of flow through said device.

14. The improvement of claim 1 or claim 2 or claim 3, in which said rotary liquid-displacement device is characterized by the ports thereof having substantially equal flow-accommodating capacity independent of the direction of flow through said device, and in which said rotor is of the sliding vane variety.

15. The improvement of claim 1 or claim 2 or claim 3, in which said rotary liquid-displacement device is characterized by the ports thereof having substantially equal flow-accommodating capacity independent of the direction of flow through said device, and in which said rotary liquid-displacement device includes a plurality of radially reciprocable pistons disposed about the axis of and coupled to said rotor.

16. The improvement of claim 1 or claim 2 or claim 3, in which said rotary liquid-displacement device is characterized by the ports thereof having substantially equal flow-accommodating capacity independent of the direction of flow through said device, and in which said rotary liquid-displacement device includes a plurality of axially reciprocable pistons on parallel axes that are angularly spaced about the axis of said rotor, and swashplate means carried by said rotor for coupling piston displacement with rotor rotation.

17. The improvement of claim 1 or claim 2 or claim 3, in which said rotary liquid-displacement device is characterized by the ports thereof having substantially equal flow-accommodating capacity independent of the direction of flow through said device, and in which said rotary liquid-displacement device includes a plurality of axially reciprocable pistons on parallel axes that are angularly spaced about a central axis of symmetry which is inclined to and intersects the axis of said rotor, and means coupling said pistons to said rotor in angularly distributed array about the rotor axis.

18. The improvement of claim 1 or claim 2 or claim 3, in which said hydraulic lift actuator is a traction cylinder.

19. The improvement of claim 1 or claim 2 or claim 3, in which said hydraulic lift actuator is a rotary hydraulic motor, a sump connected to receive hydraulic fluid discharge from said hydraulic motor for one direction of rotation thereof, and said sump and the motor connection thereto having sufficient volumetric capacity to return hydraulic fluid via said hydraulic motor for the other direction of rotation thereof and for the full span of hydraulic lift via said actuator.

20. The improvement of claim 1 or claim 2 or 3, in which said hydraulic lift actuator is a rotary hydraulic motor, a sump connected to receive hydraulic fluid discharge from said hydraulic motor for one direction of rotation thereof, and said sump and the motor connection thereto having sufficient volumetric capacity to return hydraulic fluid via said hydraulic motor for the other direction of rotation thereof and for the full span of hydraulic lift via said actuator, and in which said hydraulic motor includes a brake operative to clamp said motor against rotation, said control means being operative to set said brake in clamped condition during intervals of no controlled flow to or from said hydraulic motor and to release said brake from clamped condition during intervals of controlled flow to or from said hydraulic motor.

21. The improvement of claim 1 or claim 2 or claim 3, in which said hydraulic lift actuator is a rotary hydraulic motor, a sump connected to receive hydraulic fluid discharge from said hydraulic motor for one direction of rotation thereof, and said sump and the motor connection thereto having sufficient volumetric capacity to return hydraulic fluid via said hydraulic motor for the other direction of rotation thereof and for the full span of hydraulic lift via said actuator, and in which said hydraulic motor includes a brake operative to clamp said motor against rotation, said control means being operative to set said brake in clamped condition during intervals of no controlled flow to or from said hydraulic motor and to release said brake from clamped condition during intervals of controlled flow to or from said hydraulic motor, and in which said prime mover is of unidirectionally running variety and in which said control means includes an independent hydraulic circuit for application and release of said brake, and means including an auxiliary pump coupled to said prime mover for development of operative pressure in said independent hydraulic circuit.

22. The improvement of claim 1 or claim 2 or claim 3, in which said lift system has capacity for a rated load which comprises a fixed dead-load component and a live-load component of unestablished magnitude, and in which the pressure level in said accumulator is preselected to balance said lift system with equal hydraulic pressures at both said ports when the live-load component is at a preselected level intermediate a zero live-load condition and a maximum live-load condition.

23. The improvement of claim 1 or claim 2 or claim 3, in which said lift system has capacity for a rotated load which comprises a fixed dead-load component and a live-load component of unestablished magnitude, and in which the pressure level in said accumulator is preselected to balance said lift system with equal hydraulic pressures at both said ports when the live-load component is at a preselected level intermediate a zero live-load condition and a maximum live-load condition, and in which said intermediate level is at substantially one half said maximum.

24. In a hydraulically operated lift system wherein a pressurized hydraulic accumulator is continuously connected to a hydraulic lift actuator and wherein a rotary liquid-displacement device is interposed between the accumulator and the actuator, said rotary-displacement device having two flow-connection ports and an interposed rotor with externally accessible shaft connection to the rotor, the improvement in which a first check valve is interposed in a first connection between the accumulator and one of said connection ports and a second check valve is interposed in a second connection between the lift actuator and the other of said connection ports, a reservoir of hydraulic fluid, a third connection including a third check valve between the reservoir and said one port, and a fourth connection including a fourth check valve between the reservoir and said other port; said first and second check valves being of pilot-operated variety and oriented to check against flow toward said ports, and said third and fourth check valves being oriented to check against flow toward said reservoir; a pair of back-to-back connected check valves respectively connected to said flow-connection ports and oriented to provide a source of pilot-operating pressure at their back-to-back interconnection; means including a control valve operatively interposed between said interconnection and the pilots of said first and second check valves; and control means including a prime mover having torque-responsive connection to said shaft and including means for coordinated actuation of said prime mover and of said control valve.

25. The improvement of claim 24, in which said hydraulic lift actuator is a rotary hydraulic motor, a sump connected to receive hydraulic fluid discharge from said hydraulic motor for one direction of rotation thereof, and said sump and motor connection thereto having sufficient volumetric capacity to return hydraulic fluid via said hydraulic motor for the other direction of rotation thereof and for the full span of hydraulic lift via said actuator; said sump having an overflow spillway connection to said reservoir, for sump-accumulated volume of hydraulic fluid beyond a predetermined quantity which is at least said volumetric capacity.

26. In a hydraulically operated lift system wherein a pressurized hydraulic accumulator is continuously connected to a hydraulic lift actuator and wherein the accumulator and the actuator, said rotary-displacement device having two flow-connection ports and an interposed rotor with externally accessible shaft connection to the rotor, the improvement in which a first pilot-operated check valve is interposed in the connection between the accumulator and one port of the rotary-displacement device and is oriented to check flow in the direction from the accumulator, and in which a second pilot-operated check valve is interposed in the connection between the lift actuator and the other port of the rotary-displacement device and is oriented to check flow in the direction from the lift actuator, control means including a prime mover having torque-responsive connection to said shaft, means including pilot-operating pressure connections to said check valves and responsive to rotation of said prime mover, a reservoir of hydraulic fluid positioned to receive any leakage of hydraulic fluid from said system, liquid-level sensing means associated with said reservoir and adapted to operatively respond to a predetermined maximum reservoir volume which is indicative of a preselected minimum tolerable volume of hydraulic fluid in said system, and fluid-replenishment means including a pump and check valve and connected to draw hydraulic fluid from said reservoir and to deliver the same under pressure to said accumulator, said fluid-replenishment means being so operatively controlled by said liquid-level sensing means as to supply a fluid-replenishment charge to said accumulator upon sensed achievement of said predetermined reservoir volume.

27. In a hydraulically operated lift system wherein a pressurized hydraulic accumulator is continuously connected to a hydraulic lift actuator and wherein a rotary liquid-displacement device is interposed between the accumulator and the actuator, said rotary-displacement device having two flow-connection ports and an interposed rotor with externally accessible shaft connection to the rotor, the improvement in which a first pilot-operated check valve is interposed in the connection between the accumulator and one port of the rotary-displacement device and is oriented to check flow in the direction from the accumulator, and in which a second pilot-operated check valve is interposed in the connection between the lift actuator and the other port of the rotary-displacement device and is oriented to check flow in the direction from the lift actuator, control means including a prime mover having torque-responsive connection to said shaft, and means including pilot-operating pressure connections to said check valves and responsive to rotation of said prime mover; said last-defined means comprising a pair of back-to-back connected check valves respectively connected to said flow-connection ports and oriented to provide a source of pilot-operating pressure at the back-to-back interconnection, a control valve operatively interposed between said interconnection and the pilots of said first and second check valves, and means for opening said control valve upon rotation of said prime mover.

28. Hoist mechanism, comprising a fluid-conserving hydraulic hoist actuator having a predetermined span of operational displacement, a hydraulic accumulator, and a power integrator having first and second ports respectively connected to said actuator and to said accumulator, a volume of hydraulic-fluid self-contained within the included volume of said actuator and integrator and accumulator to the extent at least sufficient to enable operation of said actuator for more than said span of operational displacement, said accumulator having a volume substantially in excess of said hydraulic-fluid volume and said accumulator being under gas pressure at a level at least more than sufficient to balance a load in excess of a deadweight-load condition on said actuator; a first pilot-operated check valve in the port connection to said actuator and a second pilot-operated check valve in the port connection to said accumulator, each of said check valves being oriented to check flow in the direction toward said integrator, and said integrator further including rotatable means having a torsionally responsive relation to port-to-port flow through the integrator; and control means including a prime-mover connection to said rotatable means and a prime-mover-driven connection adapted to actuate the pilots of said check valves.

29. The hoist mechanism of claim 28, in which said hoist actuator includes a traction cylinder.

30. The hoist mechanism of claim 29, in which said hoist actuator includes a rotary hydraulic device with a fluid-conserving reservoir, said device having two ports and a rotor interposed between said ports and having a torsional-response relation to flow between said ports, one of said actuator ports being connected to said integrator and the other of said actuator ports being connected to discharge fluid into or to draw fluid from said reservoir in accordance with the direction of port-to-port flow through said actuator.

31. The hoist mechanism of claim 30, in which said reservoir has a spillway for overflow of hydraulic fluid beyond a predetermined volumetric excess of fluid in said reservoir over said volume of self-contained hydraulic fluid, a sump connected to collect fluid flowing past said spillway, and means including a pump connected to draw fluid from said sump for pressurized recycled delivery to said accumulator.

32. As an article of manufacture, a crane boom, comprising an elongate body adapted at one end for pulley suspension of load-bearing cable, an elongate traction cylinder secured to said body and disposed in generally parallel aligned orientation with respect to the elongation of said boom, the tail end of said cylinder facing the pulley end of said boom and at substantial offset therefrom, said cylinder including a piston with a piston rod extending beyond said cylinder and adapted to apply tensed displacements to the load-bearing cable for variously elevated load displacements via the cable, and hydraulic-control means including a power integrator carried by said boom, said power integrator including two spaced ports, means including a first pilot-operated check valve connecting one of said ports to the tail end of said cylinder, means including another pilot-operated check valve connected to the other of said ports and adapted for connection to a hydraulic accumulator, each of said check valves being oriented to check flow in the direction toward said integrator, said integrator further including rotatable means having a torsionally responsive relation to port-to-port flow through the integrator, and said control means including a prime-mover connection to said rotatable means and a prime-mover driven connection adapted to activate the pilots of said check valves.

33. The article of claim 32, further including parachute-valve means carried by said boom adjacent said cylinder and forming a component in the connection of said first check valve to said cylinder.

34. The article of claim 32, in which a second pulley is mounted for rotation at the outwardly extending end of said rod and in which said boom includes means adapted to secure load-bearing cable tensed over both pulleys.

35. In a hydraulically operated lift system wherein a pressurized hydraulic accumulator is continuously connected to a hydraulic lift actuator and wherein a rotary liquid-displacement device is interposed between the accumulator and the actuator, said rotary-displacement device having two flow-connection ports and an interposed rotor with externally accessible shaft connection to the rotor, the improvement in which a first check valve is interposed in a first connection between the accumulator and one of said connection ports and a second check valve is interposed in a second connection between the lift actuator and the other of said connection ports, a reservoir of hydraulic fluid, a third connection including a third check valve between the reservoir and said one port, and a fourth connection including a fourth check valve between the reservoir and said other port; said first and second check valves being of barrier-type pilot-operated variety and oriented to check against flow toward said ports, and said third and fourth check valves being oriented to check against flow toward said reservoir; means including a single pilot-operating pressure connection to both said pilot-operated check valves and a selectively operable control valve having one control position in which fluid-pressure communication is provided between said single pilot-operating pressure connection and a source of fluid pressure, said control valve having another control position (a) in which fluid pressure communication to said single pilot-operating pressure connection is blocked and (b) in which pressure is relieved in said single pilot-operating pressure connection, and further control means including a prime mover having torque-responsive connection to said shaft.

36. In a hydraulically operated lift system wherein a pressurized hydraulic accumulator is continuously connected to a hydraulic lift actuator and wherein a rotary liquid-displacement device is interposed between the accumulator and the actuator, said rotary-displacement device having two flow-connection ports and an interposed rotor with externally accessible shaft connection to the rotor, the improvement in which a first barrier-type pilot-operated check valve is interposed in the connection between the accumulator and one port of the rotary-displacement device and is oriented to check flow in the direction from the accumulator, and in which a second barrier-type pilot-operated check valve is interposed in the connection between the lift actuator and the other port of the rotary-displacement device and is oriented to check flow in the direction from the lift actuator, control means including a prime mover having torque-responsive connection to said shaft, and means including pilot-actuator means for the pilots of both check valves, said pilot-actuating means comprising separate hydraulic connections to said respective ports.

37. Hoist mechanism, comprising a fluid conserving hydraulic hoist actuator having a predetermined span of operational displacement, a hydraulic accumulator, and a power integrator having first and second ports respectively connected to said actuator and to said accumulator, a volume of hydraulic-fluid self-contained within the included volume of said actuator and integrator and accumulator to the extent at least sufficient to enable operation of said actuator for more than said span of operational displacement, said accumulator having a volume substantially in excess of said hydraulic-fluid volume and said accumulator being under gas pressure at a level at least more than sufficient to balance a load in excess of a deadweight-load condition on said actuator; a first barrier-type pilot-operated check valve in the port connection to said actuator and a second barrier-type pilot-operated check valve in the port connection to said accumulator, each of said check valves being oriented to check flow in the direction toward said integrator, and said integrator further including rotatable means having a torsionally responsive relation to port-to-port flow through the integrator; control means including a prime-mover connection to said rotatable means, and means including pilot-operating pressure connections to said check valves and responsive to rotation of said prime mover.

38. Hoist mechanism, comprising a fluid-conserving hydraulic hoist actuator having a predetermined span of operational displacement, a hydraulic accumulator, and a power integrator having first and second ports respectively connected to said actuator and to said accumulator, a volume of hydraulic-fluid self-contained within the included volume of said actuator and integrator and accumulator to the extent at least sufficient to enable operation of said actuator for more than said span of operational displacement, said accumulator having a volume substantially in excess of said hydraulic-fluid volume and said accumulator being under gas pressure at a level at least more than sufficient to balance a load in excess of a deadweight-load condition on said actuator; a first barrier-type pilot-operated check valve in the port connection to said actuator and a second barrier-type pilot-operated check valve in the port connection to said accumulator, each of said check valves being oriented to check flow in the direction toward said integrator, and said integrator further including rotatable means having a torsionally responsive relation to port-to-port flow through the integrator; control means including pilot-actuating means for the pilots of both said check valves, said pilot-actuating means comprising separate hydraulic connections from said respective port connections, and a prime-mover connection to said rotatable means; drain means for collection of hydraulic-fluid leakage from said mechanism, and means including a pump for returning drained hydraulic fluid from said drain means to said accumulator, whereby the self-contained volume of hydraulic fluid in said mechanism is held substantially constant.

39. In a hydraulically operated lift system wherein a pressurized hydraulic accumulator is continuously connected to a hydraulic lift actuator and wherein a rotary liquid-displacement device is interposed between the accumulator and the actuator, said rotary-displacement device having two flow-connection ports and an interposed rotor with externally accesible shaft connection to the rotor;

the improvement in which a first barrier-type pilot-operated check valve is interposed in the connection between the accumulator and one port of the rotary-displacement device and is oriented to check flow in the direction from the accumulator, and in which a second barrier-type pilot-operated check valve is interposed in the connection between the lift actuator and the other port of the rotary-displacement device and is oriented to check flow in the direction from the lift actuator, control means including a prime mover having torque-responsive connection to said shaft, and means including pilot-operating pressure connections to said check valves and responsive to rotation of said prime mover.

* * * * *

UNITED STATES PATENT AND TRADEMARK OFFICE
CERTIFICATE OF CORRECTION

PATENT NO. : 4,715,180

DATED : December 29, 1987

INVENTOR(S) : Alan H. Rosman

It is certified that error appears in the above-identified patent and that said Letters Patent is hereby corrected as shown below:

Column 5, line 65, change "liver" to --live--;

Column 6, line 10, change "to" to --for--;

Column 9, line 33, change "71'" to --71;--;

Column 11, line 35, change "as" to --an--;

Claim 26, line 68, after "wherein" insert --a rotary liquid-displacement device is interposed between--

Signed and Sealed this

Fourteenth Day of June, 1988

Attest:

DONALD J. QUIGG

*Attesting Officer*     *Commissioner of Patents and Trademarks*